United States Patent
Srivastava et al.

(10) Patent No.: US 6,941,360 B1
(45) Date of Patent: Sep. 6, 2005

(54) DETERMINING AND REGISTERING PARTICIPANTS IN A DISTRIBUTED TRANSACTION IN RESPONSE TO COMMENCING PARTICIPATION IN SAID DISTRIBUTED TRANSACTION

(75) Inventors: Alok Kumar Srivastava, Santa Clara, CA (US); Jeffrey Fischer, San Francisco, CA (US); Karl Dias, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/258,013

(22) Filed: Feb. 25, 1999

(51) Int. Cl.[7] .............................................. G06F 15/16
(52) U.S. Cl. ...................... 709/223; 709/201; 718/101
(58) Field of Search .............................. 709/223–226, 709/201–203, 217, 205; 712/28; 717/149; 704/202; 718/101; 707/8; 710/200

(56) References Cited

U.S. PATENT DOCUMENTS

| | | | | |
|---|---|---|---|---|
| 4,412,285 A | * | 10/1983 | Neches et al. | ............... 709/252 |
| 4,665,520 A | * | 5/1987 | Strom et al. | .................... 371/7 |
| 4,853,843 A | * | 8/1989 | Ecklund | ...................... 707/203 |
| 5,291,594 A | * | 3/1994 | Sekiguchi et al. | ........... 707/201 |
| 5,377,323 A | * | 12/1994 | Vasudevan | .................... 709/226 |
| 5,459,871 A | * | 10/1995 | Van Den Berg | ............ 709/104 |
| 5,485,607 A | * | 1/1996 | Lomet et al. | ................... 707/8 |
| 5,778,179 A | * | 7/1998 | Kanai et al. | ................. 709/203 |
| 5,790,788 A | * | 8/1998 | Badovinatz et al. | ........ 709/201 |
| 5,794,241 A | * | 8/1998 | Loaiza | ........................... 707/8 |
| 5,799,305 A | * | 8/1998 | Bortvedt et al. | ............... 707/10 |
| 5,809,503 A | * | 9/1998 | Aoshima | ........................ 707/8 |
| 5,835,766 A | * | 11/1998 | Iba et al. | ..................... 709/104 |
| 5,862,331 A | * | 1/1999 | Herriot | ........................ 709/219 |
| 5,884,327 A | * | 3/1999 | Cotner et al. | ............... 707/202 |
| 5,890,153 A | * | 3/1999 | Fukuda et al. | .................. 707/8 |
| 6,101,527 A | * | 8/2000 | Lejeune et al. | ............. 709/201 |
| 6,185,626 B1 | * | 2/2001 | Chivi et al. | .................. 709/248 |
| 6,247,023 B1 | * | 6/2001 | Hsiao et al. | ................. 707/202 |
| 6,438,582 B1 | * | 8/2002 | Hsiao et al. | ................. 709/206 |

* cited by examiner

*Primary Examiner*—Beatriz Prieto
(74) *Attorney, Agent, or Firm*—Marcel K. Bingham; Hickman Palermo Truong & Becker LLP

(57) ABSTRACT

A mechanism and system are provided for making available information that identifies participants of a distributed operation by registering the information with a name service. Once the participant information has been registered with the name service, the name service supplies the information to entities that request it. An example of a distributed operation is a distributed transaction executed by two or more database servers.

28 Claims, 3 Drawing Sheets

DETERMINING AND REGISTERING PARTICIPANTS IN A DISTRIBUTED TRANSACTION IN RESPONSE TO COMMENCING PARTICIPATION IN SAID DISTRIBUTED TRANSACTION

FIELD OF THE INVENTION

The present invention relates to distributed computer systems, and in particular, to determining the participants in a distributed operation.

BACKGROUND OF THE INVENTION

One of the long standing challenges in computing is the detection of deadlocks. A deadlock occurs if a set of entities exists such that each entity in the set is waiting for the release of at least one resource owned by another entity in the set. Entities capable of owning a resource are referred to herein as possessory entities. In the context of a database system, for example, possessory entities include processes and transactions. A transaction is an atomic unit of work.

For example, a transaction T1 may seek exclusive ownership of resources R1 and R2. If R1 is available and R2 is currently exclusively owned by anther transaction T2, transaction T1 may acquire exclusive ownership of R1 but must wait for R2 to become available. A deadlock will occur if transaction T2 seeks ownership of R1, and T2 is suspended to wait for R1 without releasing R2. Because both T1 and T2 are waiting for each other, they are deadlocked.

Computer systems employ a variety of deadlock handling mechanisms (deadlock handlers) that detect deadlocks. Many of deadlock handlers employ the "cycle" technique to detect deadlocks. In the cycle technique, after a process waits a threshold period of time for a resource, a wait-for graph is generated and examined for any cycles. If any cycles are identified, then the deadlock detection mechanism has identified a potential deadlock.

A wait-for graph is a graph that includes vertices that represent resources ("resource vertices") and vertices that represent possessory entities ("entity vertices"). An arc from an entity vertex to a resource vertex represents that the respective possessory entity represented by the entity vertex is waiting for ownership of the resource. An arc from a resource vertex to a entity vertex represents that the resource represented by the resource vertex is owned by the possessory entity. A cycle is detected when a chain of arcs leads both to and from the same vertex.

FIG. 1 shows an exemplary wait-for graph 100, which includes entity vertices 111 and 112 and resource vertices 121 and 122. Wait-for graph 100 was generated when a deadlock handler detected that the process represented by entity vertex 111 had waited a threshold period of time for the resource represented by resource vertex 121. Arc 131 represents that the process represented by entity vertex 111 is requesting ownership of the resource represented by resource vertex 121. Arc 132 represents that the resource represented by resource vertex 121 is owned by the process represented by entity vertex 112. Arc 133 represents that the process represented by entity vertex 112 has requested the resource represented by resource vertex 122. Arc 134 represents that the resource represented by resource vertex 122 is owned by the resource represented by entity vertex Arcs 131, 132, 133, and 134 form a loop that both extends from and leads to entity vertex 111, and thus represents a cycle. The processes represented by the entity vertices of wait-for graph 100 are therefore potentially deadlocked.

In a distributed computer system, the resources and entities involved in deadlocks may be distributed among many nodes. Thus, in the example given above, transaction T1 may reside on one node, while transaction T2 resides on another node. Detecting deadlocks on distributed computer systems may involve generating "distributed wait-for graphs". Distributed wait-for graphs are wait-for graphs that include entity vertices for entities that may be from many nodes.

Typically, the set of nodes that are executing the entities that may be involved in a deadlock cooperate with each other to generate the distributed wait-for-graph, each node producing the portion of the distributed wait-for graph that covers the node's respective entities. A process such as the deadlock handler is responsible for splitting the task of generating the distributed wait-for graph to each node of the set of nodes. Thus, generating distributed wait-for graphs involves identifying which nodes may be executing entities involved in a possible deadlock.

To determine which nodes may be involved in a possible deadlock on a distributed computer system, a deadlock handler may query all the nodes in the distributed computer system for information that indicates whether they may be involved in a deadlock. For example, assume that a deadlock handler in a distributed database system has detected that a distributed transaction has been waiting for a resource for a threshold period of time. A distrubted transaction is a transaction executed by database servers, which may reside on multiple nodes.

When a deadlock handler detects that the distributed transaction has been waiting a threshold period of time for a distributed resource, it may identify the multiple database servers involved in the distributed transaction through the broadcast query technique. In the broadcast query technique, the deadlock handler broadcasts a query to each database server in the distributed database system. The query requests information about whether the database server is involved in the distributed transaction.

Communication between database servers, especially those residing on different nodes, can involve a relatively large amount of overhead, and may substantially delay receipt by the detection handler of the information required to build the wait-for graph Often, the costs in overhead and delays is so great that deadlock handlers are configured to forego the cycle technique when attempting to detect deadlocks that may involve distributed resources. Instead, other deadlock detection techniques are used.

One common alternative to the cycle technique for detecting deadlocks is the time-out technique. Under the time-out technique, a possessory entity is presumed to be involved in a deadlock once the possessory entity waits a threshold period of time to obtain ownership of a resource. The time-out technique is less accurate in detecting deadlocks, since delays in obtaining ownership of a resource may result from many causes other than deadlock.

Based on the foregoing, it is desirable to provide a more efficient method of generating information about which nodes may have resources that are involved in a dead lock, and in more general, participants that may be involved in a distributed operation, such as a distributed transaction.

SUMMARY OF THE INVENTION

A mechanism and system are described for making available information that identifies participants of a distributed operation by registering the information with a name service. Once the participant information has been registered with the name service, the name service supplies the information to entities that request it. An example of a distributed operation is a distributed transaction executed by two or more database servers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing information about the participants in a distributed operation is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

A mechanism and system are provided for making available information that identifies participants of a distribution operation by registering he information with a name service. Once the participant information has been registered with the name service, the name service supplies the information to entities that request it. A name service shall be described in greater detail hereafter.

A distributed operation is an operation in which processes on multiple nodes participate in the accomplishment of the operation. One example of a distributed operation is a distributed transaction executed by two or more database servers. However, it should be noted that there are many types of distributed operations. The present invention is not limited to any particular type of distributed operation.

As used herein, the term "participant set" refers to a set of entities that are participating in a distributed operation. A participant set does not necessarily include all the entities participating in a distributed operation. Entities which may be members of a participant set include, for example, processes, transactions, data servers, and nodes on which processes reside.

Techniques for providing information identifying participant set members are illustrated herein in the context of a deadlock detection mechanism in a distributed database system. A process participating in a distributed transaction registers information that identifies the members of the participant set of a distributed transaction. The deadlock detection mechanism, which requires this information to generate a distributed wait-for graph, retrieves the information from the name service.

Exemplary Distrubted Database System

Figure 1:
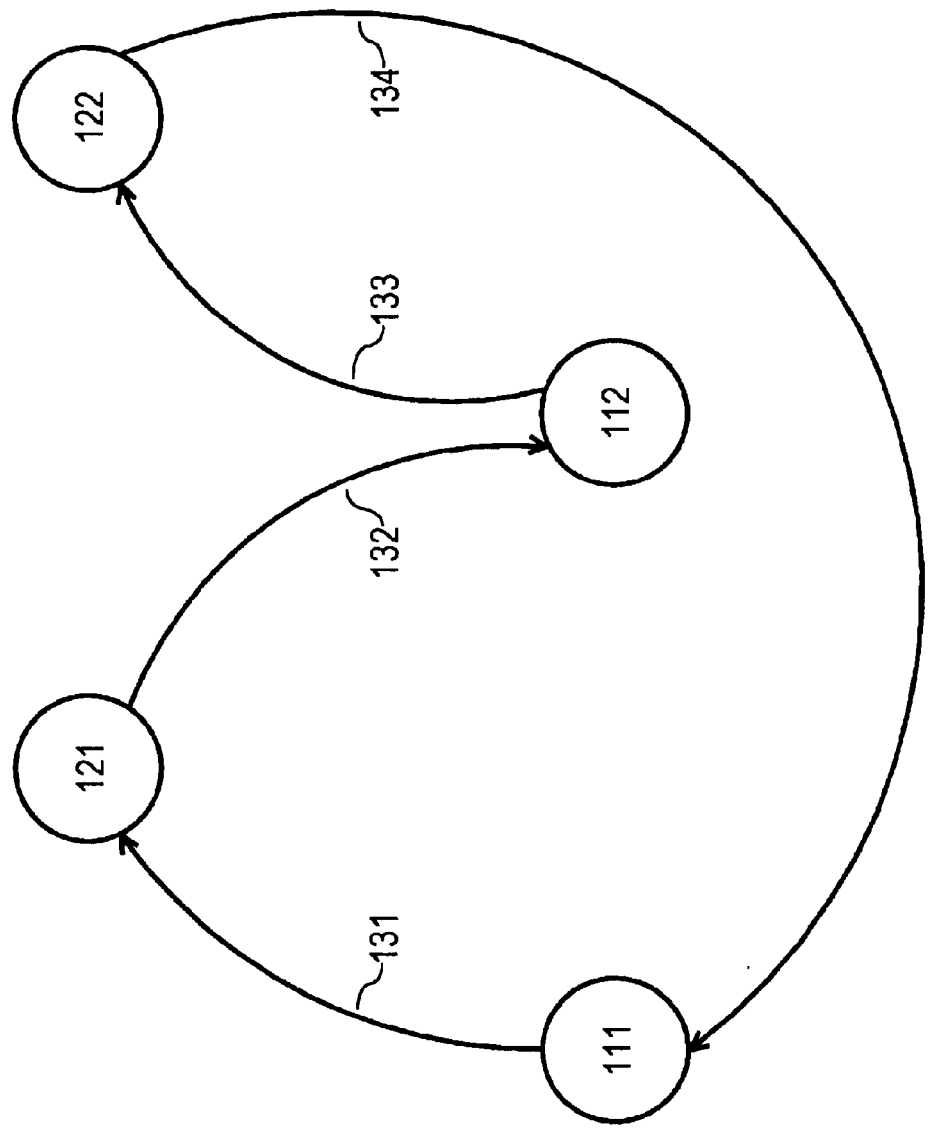
FIG. 1 is a block diagram depicting an exemplary wait-for graph.
Figure 2:
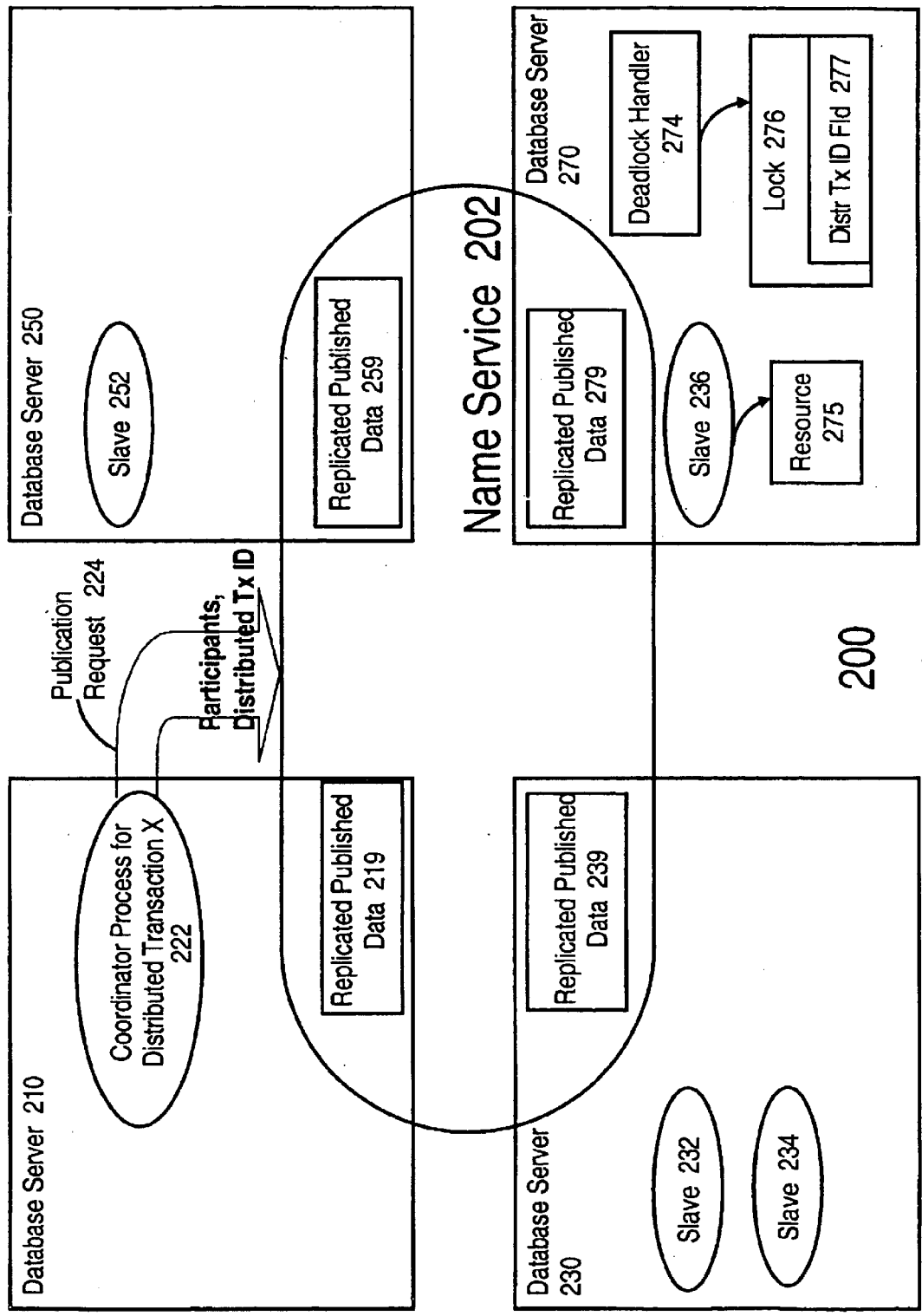
FIG. 2 is a block diagram depicting an exemplary distributed database system upon which an embodiment of the present invention may be implemented.

FIG. 2 shows a distributed database system 200 used to illustrate techniques for providing information identifying participant set members according to an embodiment of the present invention. Distributed database system 200 shows database servers 210, 230, 250, and 270, which reside on different nodes on a shared everything system, shared disk system, or shared nothing system. A database server is a combination of a set of processes and memory allocated to those processes. These processes include processes that execute transactions and processes that support those processes executing transactions.

FIG. 2 also shows the various processes executing a distributed transaction X on distributed database system 200. These processes include coordinator process 222, which is responsible for coordinating other processes participating in distributed transaction X. These other processes include slaves 232 and 234 on database server 230, slave 236 on database server 270, and slave 252 on database server 250.

The database servers that have processes participating in a particular distributed transaction are referred to as a spanning set. The spanning set of the distributed transaction X thus includes database servers 210, 230, 250, and 270. For a particular distributed transaction, the spanning set is a participant set.

Exemplary Name Service

The spanning set of distributed transaction X is communicated through a name service 202. Name service 202 is a computer component (e.g. a set of processes and a name-entry database) dedicated, at least in part, to registering information received from clients and providing that information to clients that request the information. Name service 202 allows a name service client to make information available to other name service clients.

To register information with name service 202 and make the information available to name service clients, a name service client transmits a publication request to the name service 202. A publication request is a request to make information available to a set of name service clients that request the information. Typically, the publication request includes a key data associated with the key. The data associated with the key is referred to as published data because once name service 202 receives the published data and the associated key, the name service 202 supplies the data to any name service client requesting data associated with the key.

FIG. 2 shows name service 202 according to an embodiment of the present invention. Name service 202 includes processes ("name service processes", not shown) within each of database servers 210, 230, 250, and 270. Often, a name service client directs its name service requests to a local name service process. Such a local name service processes may be, for example, a name service process within the same database server as the name service client, or a name service process that resides on the same node as the name service client. Published data is replicated and stored on each of database servers 210, 230, 250, and 270, as replicated published data 219, 239, 259, and 279.

Registering Participant Data in a Name Service

In order to provide data indicating the members of the spanning set of a distributed transaction to a node requiring that information, data indicating members of the spanning set are registered with name service 202. To register the data, coordinator process 222 transmits a publication request to name service 202, such as publication request 224. Publication request 224 specifies a published spanning set and a distributed operation key. A published spanning set is published data that indicates a spanning set for a distributed transaction. A distributed operation key is a key to associate with published data identifying participants of a distributed operation, such as a spanning set. The distributed operation key used in this example is the distributed transaction id X. A distributed transaction id is data that identifies a distributed transaction, such as distributed transaction X.

While the present invention has been illustrated using a distributed transaction id as a distributed operation key, other types of distributed operation keys are possible. Therefore, the present invention is not limited to distributed operation keys that are distributed transaction ids.

The spanning set may change as a distributed transaction progresses. So that the published spanning set accurately reflects the actual members of the spanning set, the coordinator process may update the published spanning set at various stages throughout life of the respective distributed transaction. For example, when a distributed transaction is initiated, the coordinator process causes the spawning of one or more slave processes, such as slaves 232, 234, and 236. Because all of the processes participating in distributed transaction X are on database servers 210, 230, and 270, coordinator process 222 transmits to name service 202 a publication request that specifies (1) that the published spanning set is database servers 210, 230, and 270, and (2) that distributed transaction identifier X is the distributed operation key to associate with the published spanning set. Later, coordinator process 222 spawns slave 252, expanding the spanning set. Coordinator process 222 also transmits a publication request in the manner previously described, except that the publication request specifies as published data the members of the expanded spanning set which now includes database servers 210, 230, 270 and 250.

While the present invention has been illustrated using a coordinator process that transmits publication requests to register participant set information, other types of entities may register participant set information. These other types of entities include slaves participating in a distributed transaction, and entities not participating in the distributed operation. For example, in the previous example in which coordinator process 222 causes the spawning of slave 252, slave 252 may register itself as a participant in the distributed transaction. Specifically, slave 252 transmits a request to modify the published spanning set associated with distributed transaction id X to include database server 250 in the spanning set.

Retrieving Participant Data

Once the published spanning set of a distributed transaction has been registered with name service 202, a node that requires information about the published spanning set may use the distributed transaction id as a key to retrieve the published spanning set from the name service. The phrase "a node that requires information" refers to a node having any entity, such as a process or transaction, that requires the information. For example, a, node that requires information about the published spanning set for distributed transaction X could be a node with a slave that requires the information, or a node with processes not participating in the distributed transaction that require the information.

Referring to FIG. 2, deadlock handler 274 is an example of a process that requires knowledge of the spanning set of a distributed transaction X, and that retrieves the published spanning set from name service 202. A deadlock handler may be a distributed lock manager that manages access to resources, such as resource 275. To manage access to a particular resource, a distributed lock manager uses locks, such as lock 276. A lock is a data structure that contains information about ownership of a particular resource by a particular entity. The information includes data about what entry has requested the resource, and whether the resource is waiting to own the resource or in fact owns the resource. A lock for a participant in a distributed operation may include data specifying the corresponding distributed operation key, for example, a distributed transaction id.

Lock 276 represents the state of ownership of resource 275 by slave 236. Lock 276 indicates that slave 236 has been waiting for resource 275. Lock 276 includes distributed transaction id field 277, which contains data specifying the distributed transaction id of the distributed transaction whose ownership lock 276 represents. In particular, distributed transaction id field 277 contains data specifying distributed transaction X.

Deadlock handler 274 eventually determines that lock 276 indicates that slave 236 has been waiting for resource 275 a threshold period of time. After detecting that slave 236 has been waiting a threshold period of time, deadlock handler 274 begins the process of detecting whether slave 236 may be deadlocked using the cycle technique. Before generating the distributed wait-for graph needed for the cycle technique, deadlock handler 274 determines the spanning set.

To determine the spanning set, deadlock handler 274 queries name service 202 for the published spanning set using distributed transaction id X. Specifically, deadlock handler mechanism 274 retrieves, from distributed transaction id field 277 of lock 276, data that specifies the distributed transaction id X. Deadlock handler 274 then transmits to name service 202 a request for published data associated with distributed transaction id X. In response, name service 202 returns the published spanning set, which specifies database servers 210, 230, 250, and 270 as participants in distributed transaction X.

Once deadlock handler 274 receives the published spanning set for distributed transaction X, it begins construction of the distributed wait-for graph.

As compared to the broadcast query technique previously discussed, registering with a name service information indicating the members of a spanning set allows a node needing to know this information to obtain it more efficiently. Specifically, information about the participant set is provided to deadlock handler 274 by performing a set of operations local to the node on which deadlock handler 274 resides. Deadlock handler 274 transmits a request for the published spanning set to a name service process that resides on the same node. The name service process retrieves the information from replicated published data that also resides on the same node.

Even when a name service process or the replicated published data is not located locally to a process, a name service may supply the information about the members of a spanning set more efficiently than it may be supplied under the broadcast technique. Specifically, transmitting a request and receiving a response from a single name service process located on a remote node may be performed more efficiently than transmitting multiple requests and receiving multiple responses from multiple processes located on remote nodes in a distributed database system. It should be understood that the present invention is not limited to a system where name service processes are located on the same node as the processes they service.

Providing information about the members of a participant set more efficiently improves efficiency of distributed operations that require this information. In addition, distributed operations, such as the generation of distributed wait-for graphs in a distributed database system, that were infeasible to perform because of inefficiencies attendant to determining the participant set, become feasible to perform.

The present invention has been illustrated using a deadlock handling mechanism that needed to know the members of a participant set of a distributed transaction. However, other embodiments of the present invention may involve other types of entities that need to know participants of other types of distributed operations. Therefore, it is understood that the present invention is not limited to providing information about the participant set of any particular type of distributed operation to any particular type of entity needing to know such information.

Hardware Overview

Figure 3:
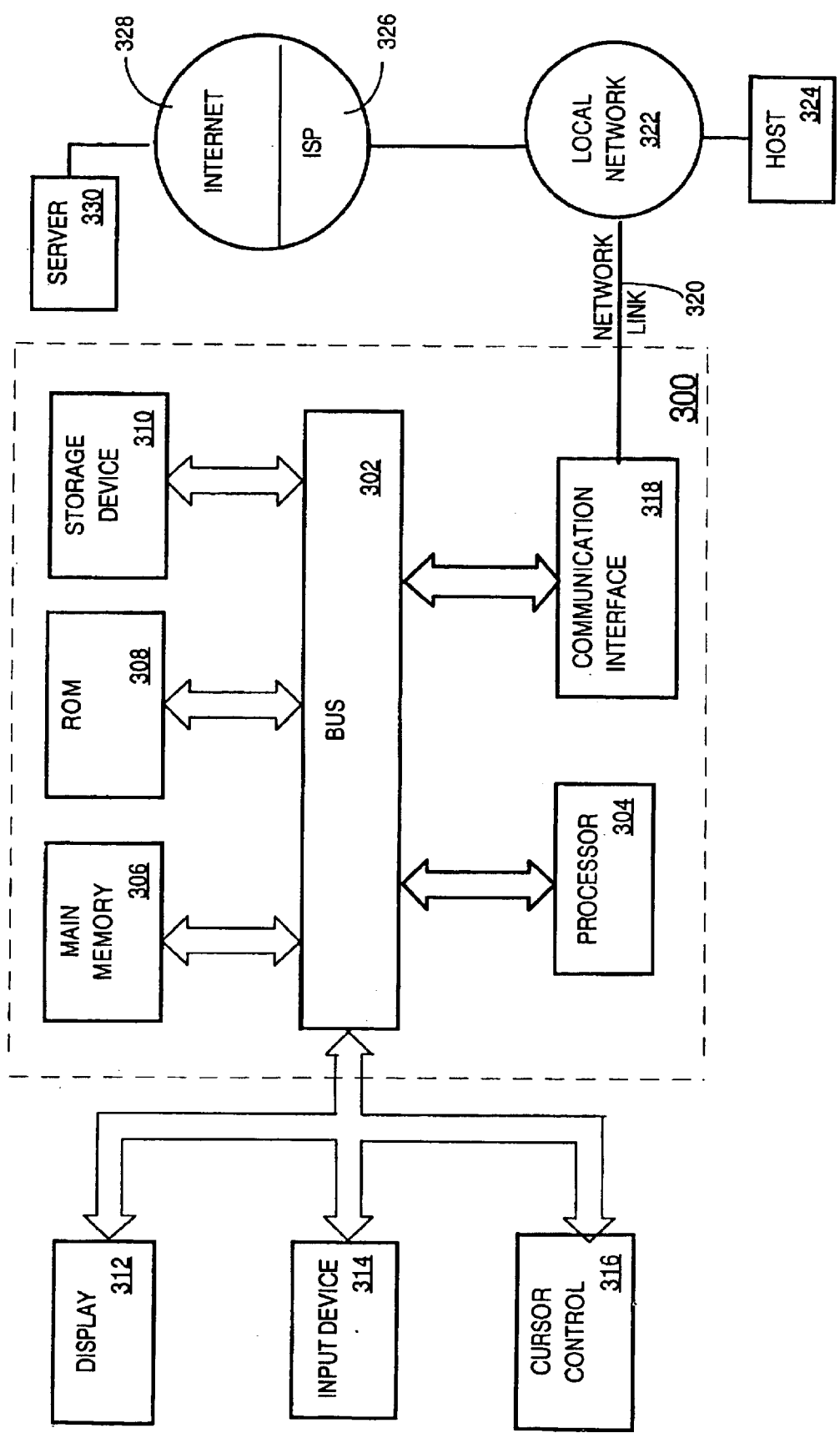
FIG. 3 is a block diagram depicting a computer system upon which an embodiment of the present invention may be implemented.

FIG. 3 is a block diagram that illustrates a computer system 300 upon which an embodiment of the present invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for providing information about the participants in a distributed operation. According to one embodiment of the invention, providing information about the participants in a distributed operation is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit requested code for an application program through Internet 328, ISP 326, local network 322 and communication interface 318. In accordance with the invention, one such downloaded application provides for providing information about the participants in a distributed operation as described herein.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of determining participants of a distributed transaction in a distributed system, the method comprising the steps of:

registering, in a name service, participant data that identifies a plurality of participants that are participating in said distributed transaction, wherein said step of registering occurs in response to said plurality of participants commencing participation in said distributed transaction; and causing a node that requires information about participants in said distributed transaction to request said participant data from said name service.

2. The method of claim 1, wherein the step of causing a node includes causing said node to retrieve said participant data in response to said node performing deadlock detection.

3. The method of claim 1, wherein:

the step of registering includes registering in said name service participant data that identifies which database servers of a plurality of database servers are participating in said distributed transaction.

4. The method of claim 1, further including the step of causing updates to said participant data to identify a new participant in said distributed transaction.

5. The method of claim 4, wherein:

said distributed transaction is a distributed database transaction being executed by a set of processes coordinated by a coordinator process;

the method further includes the step of said coordinator process causing a new process on a database server to participate in said distributed database transaction; and the step of causing updates to said participant data includes said coordinator process causing updates to said participant data in response to said new process participating in said distributed database transaction.

6. The method of claim 1, wherein:

said distributed transaction is a distributed database transaction;

the step of registering includes registering participant data that identifies which database servers of a plurality of database servers are participating in said distributed database transaction; and the step of causing a node includes causing a node that requires information about participants in said distributed database transaction to retrieve said participant data from said name service.

7. The method of claim 1, wherein:

said distributed transaction is a distributed database transaction;

the method further includes the step of assigning a transaction identifier to said distributed database transaction;

the step of registering includes registering, in said name service, data that associates said participant data with said transaction identifier; and the step of causing a node includes causing a node to request, from said name service, published data associated with said transaction identifier.

8. The method of claim 1, wherein the steps further include said name service receiving a request from a first process to supply said participant data, wherein said name service and said first process reside on said node.

9. The method of claim 8, wherein the step of causing a node includes said name service retrieving said participant data from one or more data structures residing on said node in response to receiving said request.

10. A computer-readable medium carrying one or more sequences of one or more instructions for determining participants of a distributed transaction in a distributed system, the one or more sequences of one or more instructions including instructions which, when executed by one or more processors, cause the one or more processors to perform the steps of:

registering in a name service participant data that identifies a plurality of participants that are participating in said distributed transaction, wherein said step of registering occurs in response to said plurality of participants commencing participation in said distributed transaction; and causing a node that requires information about participants in said distributed transaction to request said participant data from said name service.

11. The computer-readable medium of claim 10, wherein the step of causing a node includes causing said node to retrieve said participant data in response to said node performing deadlock detection.

12. The computer-readable medium of claim 10, wherein:

the step of registering includes registering in said name service participant data that identifies which database servers of a plurality of database servers are participating in said distributed transaction.

13. The computer-readable medium of claim 10, further including the step of causing updates to said participant data to identify a new participant in said distributed transaction.

14. The computer-readable medium of claim 13, wherein:

said distributed transaction is a distributed database transaction being executed by a set of processes coordinated by a coordinator process;

the computer-readable medium further includes sequences of instructions for performing the step of said coordinator process causing a new process on a database server to participate in said distributed database transaction; and the step of causing updates to said participant data includes said coordinator process causing updates to said participant data in response to said new process participating in said distributed database transaction.

15. The computer-readable medium of claim 10, wherein:

said distributed transaction is a distributed database transaction;

the step of registering includes registering participant data that identifies which database servers of a plurality of database servers are participating in said distributed database transaction; and the step of causing a node includes causing a node that requires information about participants in said distributed database transaction to retrieve said participant data from said name service.

16. The computer-readable medium of claim 10, wherein:

said distributed transaction is a distributed database transaction;

the steps further include the step of assigning a transaction identifier to said distributed database transaction;

the step of registering includes registering in said name service data that associates said participant data with said transaction identifier; and the step of causing a node includes causing a node to request, from said name service, published data associated with said transaction identifier.

17. The computer-readable medium of claim 10, wherein the steps further include said name service receiving a request from a first process to supply said participant data, wherein said name service and said first process reside on said node.

18. The computer-readable medium of claim 17, wherein the step of causing a node includes said name service retrieving said participant data from one or more data structures residing on said node in response to receiving said request.

19. A method for determining a plurality of participants that are participating in a distributed transaction, the method comprising the computer-implemented steps of:

in response to said plurality of participants commencing participation in said distributed transaction, receiving first data that identifies said plurality of participants;

in response to receiving said first data, registering said first data;

receiving a request from a node;

in response to said request from said node, providing second data to said node, wherein said second data includes at least part of said first data.

20. The method of claim 19, wherein a name service performs the steps of receiving said first data, registering said first data, receiving said request, and providing said second data.

21. The method of claim 19, wherein said node uses said second data to determine whether a deadlock exists, and wherein said request is received after a particular participant of said plurality of participants has waited for a threshold period of time.

22. The method of claim 19, wherein:

said distributed transaction is a distributed database transaction; and said first data identifies one or more database servers of a plurality of database servers that are participating in said distributed database transaction.

23. The method of claim 19, wherein:

said plurality of participants includes all participants in the distributed transaction; and said first data identifies said all participants in the distributed transaction.

24. A computer-readable medium carrying one or more sequences of one or more instructions for determining a plurality of participants that are participating in a distributed transaction, the one or more sequences of one or more instructions including instructions which, when executed by one or more processors, cause the one or more processors to perform the steps of:

prior to said plurality of participants commencing participation in said distributed transaction, receiving first data that identifies said plurality of participants;

in response to receiving said first data, registering said first data;

receiving a request from a node;

in response to said request from said node, providing second data to said node, wherein said second data includes at least part of said first data.

25. The computer-readable medium of claim 24, wherein a name service performs the steps of receiving said first data, registering said first data, receiving said request, and providing said second data.

26. The computer-readable medium of claim 24, wherein said node uses said second data to determine whether a deadlock exists, and wherein said request is received after a particular participant of said plurality of participants has waited for a threshold period of time.

27. The computer-readable medium of claim 24, wherein:

said distributed transaction is a distributed database transaction; and said first data identifies one or more database servers of a plurality of database servers that are participating in said distributed database transaction 28. The computer-readable medium of claim 24, wherein:

said plurality of participants includes all participants in the distributed transaction; and said first data identifies said all participants in the distributed transaction.

* * * * *